US011945201B2

(12) United States Patent
Deguchi et al.

(10) Patent No.: US 11,945,201 B2
(45) Date of Patent: Apr. 2, 2024

(54) CAVITY-CONTAINING POLYESTER FILM AND METHOD FOR PRODUCING SAME

(71) Applicant: TOYOBO CO., LTD., Osaka (JP)

(72) Inventors: Shoji Deguchi, Tsuruga (JP); Shunichiro Baba, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 17/347,749

(22) Filed: Jun. 15, 2021

(65) Prior Publication Data
US 2021/0308982 A1 Oct. 7, 2021

Related U.S. Application Data

(63) Continuation of application No. 15/741,543, filed as application No. PCT/JP2016/069492 on Jun. 30, 2016.

(30) Foreign Application Priority Data

Jul. 10, 2015 (JP) ................................. 2015-138738

(51) Int. Cl.
| B32B 3/26 | (2006.01) |
| B29C 44/12 | (2006.01) |
| B29C 44/14 | (2006.01) |
| B29C 48/08 | (2019.01) |
| B29C 48/18 | (2019.01) |
| B29C 48/21 | (2019.01) |
| B29K 21/00 | (2006.01) |
| B32B 27/08 | (2006.01) |
| B32B 27/20 | (2006.01) |
| B32B 27/32 | (2006.01) |
| B32B 27/36 | (2006.01) |
| B32B 37/06 | (2006.01) |

(52) U.S. Cl.
CPC ............ *B32B 3/26* (2013.01); *B29C 44/1271* (2013.01); *B29C 44/1285* (2013.01); *B29C 44/14* (2013.01); *B29C 48/18* (2019.02); *B32B 27/08* (2013.01); *B32B 27/205* (2013.01); *B32B 27/32* (2013.01); *B32B 27/36* (2013.01); *B32B 37/06* (2013.01); *B29C 48/08* (2019.02); B29C 48/21 (2019.02); B29K 2021/003 (2013.01); B32B 2250/03 (2013.01); B32B 2250/24 (2013.01); B32B 2250/40 (2013.01); B32B 2264/0257 (2013.01); B32B 2264/10 (2013.01); B32B 2264/102 (2013.01); B32B 2270/00 (2013.01); B32B 2272/00 (2013.01); B32B 2307/40 (2013.01); B32B 2307/4026 (2013.01); B32B 2307/41 (2013.01); B32B 2307/516 (2013.01); B32B 2307/518 (2013.01); B32B 2307/546 (2013.01); B32B 2307/72 (2013.01); B32B 2307/718 (2013.01); B32B 2323/10 (2013.01)

(58) Field of Classification Search
CPC ........ B32B 2250/03; B32B 2264/0257; B32B 2270/00; B32B 2323/10; B32B 27/08; B32B 27/205; B32B 27/32; B32B 27/36; B29C 48/0018; B29C 48/022; B29C 48/08; B29C 48/21; B29C 55/04; B29C 55/143; B29K 2023/12; B29K 2067/00; B29K 2067/003; B29K 2105/0094; B29K 2105/041; B29K 2105/26
See application file for complete search history.

(56) References Cited

U.S. PATENT DOCUMENTS

| 3,944,699 | A | | 3/1976 | Mathews et al. | |
| 5,916,990 | A | | 6/1999 | Yanagihara et al. | |
| 6,136,420 | A | * | 10/2000 | Hibiya | B32B 27/36 |
| | | | | | 428/218 |
| 6,753,080 | B1 | * | 6/2004 | Sebastian | B41M 5/52 |
| | | | | | 428/221 |
| 2001/0044009 | A1 | * | 11/2001 | Peiffer | B32B 27/20 |
| | | | | | 428/458 |

(Continued)

FOREIGN PATENT DOCUMENTS

| EP | 1 142 937 A2 | 10/2001 |
| JP | 49-134755 A | 12/1974 |

(Continued)

OTHER PUBLICATIONS

Prime Polymer (Prime Polypro Product data sheet; Mar. 2008).*
Definitaiton of 'label' (https://www.collinsdictionary.com/us/dictionary/english/label) Accessed: 5/152023.*
Packaging (www.vocabulary.com/dictionary/packaging) Accessed Aug. 24, 2023.*
International Search Report dated Sep. 27, 2016, issued in counterpart International Application No. PCT/JP2016/069492 (in English; 2 pages).

(Continued)

Primary Examiner — Alicia J Weydemeyer
(74) Attorney, Agent, or Firm — WHDA, LLP

(57) ABSTRACT

A cavity-containing polyester film is disclosed, including a layer (layer A) which has therein cavities, and layers (layers B) which each include a polyester resin containing inorganic particles and which are laminated, respectively, over both surfaces of the layer A. The layer A includes a composition including a polyester resin and a polypropylene resin. The polypropylene resin satisfies requirements of: (1) the melt flow rate (MFR) ranges from 1.0 to 10 g/10-minutes (at a temperature of 230° C. under a load of 2.16 kg); (2) the deflection temperature is 85° C. or higher under load (at a bending stress of 0.45 MPa); and (3) the weight-average molecular weight Mw ranges from 200,000 to 450000 (measured by gel permeation chromatography (GPC)); and the molecular weight distribution ranges from 2 to 6 (being represented as the ratio of the weight-average molecular weight Mw to the number-average molecular weight Mn of the polypropylene resin (Mw/Mn)).

18 Claims, No Drawings

(56) References Cited

U.S. PATENT DOCUMENTS

| | | | | |
|---|---|---|---|---|
| 2013/0112271 A1* | 5/2013 | Ikehata | .................. | B32B 27/36 |
| | | | | 252/582 |
| 2013/0236793 A1* | 9/2013 | Takagi | ................ | H01M 50/417 |
| | | | | 429/251 |
| 2018/0072828 A1 | 3/2018 | Tamura et al. | | |

FOREIGN PATENT DOCUMENTS

| | | | | |
|---|---|---|---|---|
| JP | 54-29550 | B1 | | 9/1979 |
| JP | 2-180933 | A | | 7/1990 |
| JP | 2-284929 | A | | 11/1990 |
| JP | 7-17779 | B2 | | 3/1995 |
| JP | 8-252857 | A | | 10/1996 |
| JP | 10-128933 | A | | 5/1998 |
| JP | 11-12377 | A | | 1/1999 |
| JP | 11-116716 | A | | 4/1999 |
| JP | 2009073010 | A | * | 4/2009 |
| WO | 95/31490 | F1 | | 11/1995 |
| WO | 2012/008488 | A1 | | 1/2012 |

OTHER PUBLICATIONS

Kania, T. et al., "New Deployment to Fiber and the Film Field of Low Tacticity Polypropylne", Polymer Material Forum Lecture reoceedings; Japan, Nov. 11, 2009; vol. 18, pp. 29-30 (w/ partial English translation; cited in Japanese Office Action dated Sep. 26, 2018).

Asahi Chemical AMIDASU, Inc., "Plastic", Editorial Department, Plastic Datebook, Japan, Kogyo Chosakai Publishing, Dec. 1, 1999, vol. 18, pp. 364-367 (w/ partial English translation; cited in Japanese Office Action dated Sep. 26, 2018).

Office Action dated Sep. 26, 2018, issued in counterpart Japanese Application No. 2017-528379 (w/ English translation, 6 pages).

Extended (Supplementary) European Search Report dated Feb. 5, 2019, issued in counterpart European application 16824286.5 (in English; 8 pages).

Office Action dated Mar. 21, 2019, issued in counterpart Chinese Application No. 201680040027.0 (w/ English translation, 20 pages).

Office Action dated Sep. 20, 2019, issued in counterpart Taiwanese Application No. 105121545 (w/ English translation, 9 pages).

Office Action dated Dec. 6, 2019, issued in counterpart Indian Application No. 201847003956 (w/ English translation; 5 pages).

Tamura et al., "The effect of molecular structure of polypropylene on stretchability for biaxially oriented film", Polymer Engineering and Science, vol. 52, Issue 6, pp. 1383-1393 (2012) (in English; U.S. Appl. No. 15/741,543).

Prime Polymer Prime Polypro (Film) product data sheet (2008) (1 page; in English; U.S. Appl. No. 15/741,543).

* cited by examiner

CAVITY-CONTAINING POLYESTER FILM AND METHOD FOR PRODUCING SAME

CROSS-REFERENCE TO RELATED APPLICATIONS

This application is a Continuation of U.S. patent application Ser. No. 15/741,543, filed on Jan. 3, 2018, which is a U.S. National Stage entry of International Application No. PCT/JP2016/069492, filed on Jun. 30, 2016, which claims priority to Japanese Patent Application No. 2015-138738, filed on Jul. 10, 2015. The entirety of each of the foregoing is incorporated herein by reference.

TECHNICAL FIELD

The present invention relates to a cavity-containing polyester film which contains sufficient cavities and is further excellent in concealing performance and whiteness.

BACKGROUND ART

Synthetic paper, which is a paper-alternative made mainly of synthetic resin, is better in water resistance, moisture-absorption dimension stability, surface stability and others than natural paper, and is frequently used for labels, stickers, posters, recording paper, packaging material, and others. A main material of synthetic paper is, for example, a polyethylene resin, a polypropylene resin, or a polyester resin. In particular, the polyester resin, a typical example of which is polyethylene terephthalate, is developed to broad-scope articles because of excellent mechanical properties, thermal properties and other properties.

General examples of a method for yielding a film similar in functions to paper include a method of incorporating fine cavities into a film in a large quantity; and a method of subjecting a flat film to a surface treatment, such as sandblasting treatment, chemical etching treatment or matting treatment, to make its surfaces rough. Out of these methods, the former method, in which fine cavities are incorporated into a film in a large quantity, can give the film a concealing performance and a whiteness as paper has, and further make the film itself light to restrain costs per area of the film, and the method can give the film an appropriate softness and cushion property. Thus, this method is adopted in many cases because of an advantage that when a print is made on the film, the film produces an excellent image vividness, and other advantages.

A general method for generating fine cavities in a film is, for example, a method of blending, into a polyester resin, a thermoplastic resin incompatible with the polyester resin (hereinafter the thermoplastic resin will be called the incompatible resin) to yield a sheet in which the incompatible resin is dispersed in the polyester resin, and then drawing the sheet in at least one axial direction of the sheet to cause interfacial peeling between the polyester resin and the incompatible resin, thereby generating cavities. The incompatible resin for generating the cavities in the polyester resin is preferably a polyethylene resin, a polypropylene resin, polyolefin resins such as polymethylpentene resin (see, for example, Patent Documents 1 to 3), or a polystyrene resin (see, for example, Patent Documents 4 and 5). Out of these resins, a polypropylene resin is particularly preferred from the viewpoint of the cavity-generation property of the film, and cost performance.

However, merely when a polypropylene resin is dispersed in a polyester resin, dispersed particles made of the polypropylene resin (hereinafter called the polypropylene dispersed particles) increase in dispersion diameter, so that cavities are easily generated. However, the increase of the cavities in diameter does not give the resultant film a sufficient concealing performance, and further makes the film-formability of the polyester resin bad. Thus, it is suggested to cause the polypropylene resin to be finely dispersed. As a method for causing the resin to be finely dispersed, a method has been so far suggested in which a surfactant, or a dispersing agent such as polyethylene glycol is added to the polyester/polypropylene-resin (see, for example, Patent Documents 6 and 7). Although the case of the addition of the surfactant, or the dispersing agent such as polyethylene glycol produces an advantageous effect of dispersing the polypropylene resin finely, the polypropylene resin is unfavorably deformed in a thermally drawing step and a thermally fixing step of the film. Thus, the resultant cavities are also easily crushed. Consequently, the drawn film cannot gain a sufficient lightness and cushion property. Moreover, the surfactant or polyethylene glycol is poor in heat resistance. Accordingly, in a melt-extruding step of the polyester/polypropylene-resin system, this step being matched with the polyester resin, the surfactant or the polyethylene glycol is thermally deteriorated with ease to cause a problem that the resultant film is lowered in whiteness, and in some cases the polyester resin suffers from deterioration-promotion to be deteriorated in film-formability.

In a laterally drawing step in the production of a polyester film, the film is generally grasped with tenter clips. The clip-grasped portions are called ear portions of the film. The ear portions are collected, and then re-used, or subjected to waste disposal. From the viewpoint of a decrease in raw material costs, and the environment, the collection and re-use of the ear portions are preferred. However, when a polypropylene resin or a surfactant is used into the polyester, the resultant polyester is thermally deteriorated with ease by thermal hysteresis not only in the extruding step of the polyester but also in the step for the collection. Thus, when the collected material is used, the polyester is deteriorated in film-formability, and the film is further lowered in whiteness. Furthermore, the polypropylene resin in the collected material is lowered in cavity-generating performance by the thermal deterioration in the collection step. It is therefore difficult to yield a cavity-containing polyester film having a sufficiently lightness and cushion property.

PRIOR ART DOCUMENTS

Patent Documents

Patent Document 1: JP-A-S49-134755
Patent Document 2: JP-A-H02-284929
Patent Document 3: JP-A-H02-180933
Patent Document 4: JP-B-S54-29550
Patent Document 5: JP-A-H11-116716
Patent Document 6: JP-B-H07-17779
Patent Document 7: JP-A-H08-252857

SUMMARY OF THE INVENTION

Problems to be Solved by the Invention

An object of the present invention is to overcome the above-mentioned problems in the prior art and provide a cavity-containing polyester film which is excellent in cavity-generation property and further excellent in concealing performance and whiteness even when the film mainly makes use of a polypropylene resin as a cavity generating agent. Another object thereof is to provide a cavity-containing polyester film about which cavity-generation property is kept and further concealing performance and whiteness are excellent even when a collected material is used for the film.

Means for Solving the Problems

The inventors have made eager investigations to find out that the use of a specified polypropylene resin makes it possible to control the dispersion diameter of polypropylene dispersed particles in a polyester resin even when no dispersing agent is used, and further to decrease the deformation of the polypropylene dispersed particles at the time of heating and drawing the resultant film, or fixing the film thermally. As a result, a cavity-containing polyester film can be yielded which is excellent in whiteness, concealing performance, and cavity-generation property.

The inventors have also found out that the use of the specified polypropylene resin makes it possible that even when a collected material is used for polyester-film-production, a cavity-containing polyester film is yielded which is restrained from being thermally deteriorated in an extruding step of the polyester or a step for the collection, and which keeps the cavity-generating performance of the polypropylene resin and is excellent in concealing performance and whiteness.

Accordingly, the cavity-containing polyester film of the present invention has the following subject matters:

Item 1:
A cavity-containing polyester film, comprising a layer (layer A) which has therein cavities, and layers (layers B) which each comprise a polyester resin containing inorganic particles and which are laminated, respectively, over both surfaces of the layer A; the layer A comprising a composition comprising a polyester resin and a polypropylene resin; the polypropylene resin satisfying all of the following requirements (1) to (3); and the film having an apparent density ranging from 0.8 to 1.2 g/cm$^3$:
(1) the polypropylene resin having a melt flow rate (MFR) ranging from 1.0 to 10 g/10-minutes (at a temperature of 230° C. under a load of 2.16 kg),
(2) the polypropylene resin showing a deflection temperature of 85° C. or higher under load (at a bending stress of 0.45 MPa), and
(3) the polypropylene resin having a weight-average molecular weight Mw ranging from 200000 to 450000, this weight-average molecular weight being measured by gel permeation chromatography (GPC), and having a molecular weight distribution ranging from 2 to 6, this molecular weight distribution being represented as the ratio of the weight-average molecular weight Mw to the number-average molecular weight Mn of the polypropylene resin (Mw/Mn).

Item 2:
The cavity-containing polyester film according to item 1, wherein the layer A further comprises a collected material of the cavity-containing polyester film in a proportion of 5 to 60% by weight.

Item 3:
The cavity-containing polyester film according to item 1 or 2, wherein the inorganic particles in the layers B comprise titanium oxide.

Item 4:
The cavity-containing polyester film according to any one of items 1 to 3, having an optical density of 0.55 or more (in terms of a value when the film thickness is regarded as 50 μm) and a color tone b-value of 4 or less.

Item 5:
The cavity-containing polyester film according to any one of items 1 to 4, having a bending resistance of 10 mN·cm or more in each of the longitudinal direction and the lateral direction of the film.

Item 6:
A method for producing a cavity-containing polyester film having an apparent density ranging from 0.8 to 1.2 g/cm$^3$, comprising the step of: melt-extruding a laminate into a sheet form, this laminate being a laminate comprising a layer (layer A) which comprises a composition comprising a polyester resin and a polypropylene resin satisfying all of the following requirements (4) to (6), and layers (layers B) which each comprise a polyester resin containing inorganic particles and which are laminated, respectively, over both surfaces of the layer A:
(4) the polypropylene resin having a melt flow rate (MFR) ranging from 1.0 to 10 g/10-minutes (at a temperature of 230° C. under a load of 2.16 kg),
(5) the polypropylene resin showing a deflection temperature of 85° C. or higher under load (at a bending stress of 0.45 MPa), and
(6) the polypropylene resin having a weight-average molecular weight Mw ranging from 200000 to 450000, this weight-average molecular weight being measured by gel permeation chromatography (GPC), and having a molecular weight distribution ranging from 2 to 6, this molecular weight distribution being represented as the ratio of the weight-average molecular weight Mw to the number-average molecular weight Mn of the polypropylene resin (Mw/Mn);
and next drawing the sheet into at least one axial direction of the sheet to incorporate cavities into the layer A.

Item 7:
The method according to item 6 for producing the cavity-containing polyester film, wherein a collected material yielded from the cavity-containing polyester film is further incorporated into the layer A in a proportion of 5 to 60% by weight.

Effect of the Invention

The present invention makes it possible to provide a cavity-containing polyester film which is excellent in cavity-generation property and further excellent in concealing performance and whiteness even when the film mainly makes use of a polypropylene resin as a cavity generating agent. The invention makes it possible to provide a cavity-containing polyester film about which cavity-generation property is kept and further concealing performance and whiteness are excellent, without damaging properties of the provided film, even when a collected material is used for the film.

MODE FOR CARRYING OUT THE INVENTION

Hereinafter, the present invention will be described in detail.

In the cavity-containing polyester film of the present invention, layers (layers B) which each include a polyester resin containing inorganic particles are laminated, respectively, over both surfaces of a layer (layer A) which has therein cavities. The layer A includes a composition including a polyester resin and a polypropylene resin. The film has an apparent density ranging from 0.8 to 1.2 g/cm$^3$. About the polypropylene resin, it is preferred to use, as a raw material thereof, a polypropylene resin satisfying all of the following requirements (1) to (3):

(1) the polypropylene resin has a melt flow rate (MFR) ranging from 1.0 to 10 g/10-minutes (at a temperature of 230° C. under a load of 2.16 kg), (2) the polypropylene resin shows a deflection temperature of 85° C. or higher under load (at a bending stress of 0.45 MPa), and (3) the polypropylene resin has a weight-average molecular weight Mw ranging from 200000 to 450000, this weight-average molecular weight being measured by gel permeation chromatography (GPC), and has a molecular weight distribution ranging from 2 to 6, this molecular weight distribution being represented as the ratio of the weight-average molecular weight Mw to the number-average molecular weight Mn of the polypropylene resin (Mw/Mn).

In the cavity-containing polyester film of the present invention, the polyester resins, which are main components of the layer A and the layers B, are each a polymer synthesized from a dicarboxylic acid or an ester-producing derivative thereof, and a diol or an ester-producing derivative thereof. Typical examples of such a polyester resin include polyethylene terephthalate, polybutylene terephthalate, and polyethylene-2,6-naphthalate. Polyethylene terephthalate is preferred from the viewpoint of mechanical properties and the heat resistance thereof, and costs.

These polyester resins may each be copolymerized with a different component as far as the resultant does not damage the objects of the present invention. Specific examples of the copolymerizable component as a dicarboxylic acid component include isophthalic acid, naphthalenedicarboxylic acid, 4,4-diphenyldicarboxylic acid, adipic acid, and sebacic acid; and ester-producing derivatives thereof. Specific examples of the copolymerizable component as a diol component include diethylene glycol, hexamethylene glycol, neopentyl glycol, and cyclohexanedimethanol. Other examples thereof include polyoxyalkylene glycols such as polyethylene glycol and polypropylene glycol. The copolymerization amount thereof is preferably 10% or less by mole, more preferably 5% or less by mole of repeating units constituting the copolymer.

The method for producing the polyester resin is, for example, a method of using, as main starting materials, the above-mentioned dicarboxylic acid or ester-producing derivative thereof, and the diol or ester-producing derivative thereof initially to conduct an esterification or interesterification reaction in a usual way, and then subjecting the resultant further to a polycondensation reaction at a high temperature under a reduced pressure to produce the polyester resin.

The intrinsic viscosity of the polyester resin ranges preferably from 0.50 to 0.9 dl/g, more preferably from 0.55 to 0.85 dl/g from the viewpoint of, e.g., the film-formability and the collecting-usability of the resin.

The following will describe the polypropylene resin, which is an incompatible resin used as a cavity generating agent in the present invention. The cavity-containing polyester film of the invention adopts a specified layer structure and makes use of the specified polypropylene resin. Even when a collected material is used for the film, the adoption and use make it possible to cause the film to maintain cavity-generation property. Accordingly, the cavity-containing polyester film can be yielded to be able to gain a sufficiently lightness and cushion property and be further excellent in concealing performance and whiteness.

The polypropylene resin used in the present invention is preferably a crystalline polypropylene having propylene units in a proportion that is preferably 95% or more by mole, more preferably 98% or more by mole. The polypropylene resin is in particular preferably a polypropylene homopolymer having propylene units in a proportion of 100% by mole.

The polypropylene resin used in the present invention has a melt flow rate (MFR) ranging preferably from 1.0 to 10.0 g/10-minutes, more preferably from 1.5 to 7.0 g/10-minutes, even more preferably from 1.5 to 4.0 g/10-minutes for the cavity-generation property of the film and the film-formability of the polyester. If the MFR is higher than 10.0 g/10-minutes, at the time of extruding the polyester/polypropylene-resin system the polypropylene dispersed particles are easily deformed so that cavities are not easily formed, and the use of a collected material is not preferred since the film is further lowered in cavity-generation property. In the meantime, if the MFR is lower than 1.0 g/10-minutes, the dispersibility of the polypropylene dispersed particles deteriorate. Consequently, large cavities are formed; however, unfavorably, the resultant film cannot gain a sufficient concealing performance and the film-formability also deteriorates. The melt flow rate (MFR) is a value measured according to JIS K 7210 under conditions of a temperature of 230° C. and a load of 2.16 kg.

About the polypropylene resin used in the present invention, from the viewpoint of the cavity-generating performance thereof, the deflection temperature under load is preferably 85° C. or higher, more preferably 90° C. or higher, even more preferably 95° C. or higher. The upper limit thereof does not need to be especially limited. The upper limit is preferably 135° C. or lower. If the deflection temperature under load is lower than 85° C., cavities are formed and simultaneously the polypropylene dispersed particles are easily crushed, particularly, in the longitudinally drawing step of drawing the film while the film is heated at not lower than the glass transition temperature of the polyester resin, which will be detailed later. Consequently, the cavities are not easily formed, either. The deflection temperature of any test specimen under load is a value measured according to the method B in JIS K 7191-1 and 2 when the bending stress of the test specimen is 0.45 MPa.

About the polypropylene resin used in the present invention, the weight-average molecular weight (Mw) is preferably from 200000 to 450000, more preferably from 250000 to 400000 from the viewpoint of the cavity-generating performance, and a restraint of a thermal deterioration of the resin in the extruding step and the collecting step. If the Mw is more than 450000, the polypropylene dispersed particles become bad in dispersibility. Consequently, large cavities are formed; however, unfavorably, the resultant film cannot gain a sufficient concealing performance and the film-formability also deteriorates. If the Mw is less than 200000, unfavorably, the polypropylene dispersed particles are easily deformed not to form cavities easily and further when a collected material is used, the film is further lowered in cavity-generation property. The molecular weight dispersion of the resin, which is the ratio between the weight-average molecular weight (Mw) and the number-average molecular weight (Mn) (Mw/Mn) is preferably from 2 to 6, more preferably from 2 to 5. The Mw/Mn is an index representing the width of the molecular weight distribution. As this value is larger, the molecular weight distribution is wider. If the Mw/Mn is larger than 6, the resin increases in the proportion of its low molecular weight components. Thus, when a collected material is used, unfavorably, the resultant film is lowered in whiteness and is remarkably lowered in cavity-generation property. When the Mw/Mn is 2 or more, the film is suitable for industrial production from the viewpoint of costs. The weight-average molecular weight (Mw) and the number-average molecular weight (Mn) are each a value measured by gel permeation chromatography (GPC).

The content of the polypropylene resin is preferably from 3 to 25% by weight, more preferably from 5 to 20% by weight of the total amount of the individual compositions in the layer A. If the polypropylene resin content is less than 3% by weight, it is feared that cavities cannot be formed for giving the film a sufficient lightness and cushion property. In the meantime, if the polypropylene resin content is more than 25% by weight, the polyester/polypropylene-resin system unfavorably tends to be deteriorated in film-formability.

The layer A may include one or more incompatible resins other than the polypropylene resin as far as the incompatible resin (s) does/do not damage the objects of the present invention. However, the proportion of the polypropylene resin in the total amount of the incompatible resin (s) in the layer A is preferably 90% or more by weight, more preferably 95% or more by weight, most preferably 100% by weight. It is preferred that the layer A does not contain a dispersing agent, such as polyethylene glycol or a surfactant, from the viewpoint of the whiteness and the cavity-generation property of the film.

The above-mentioned polyester resin or polypropylene resin may contain a small amount of a different polymer, or an additive as far as the objects of the present invention are not damaged. The additive may be an antioxidant, a thermal stabilizer, a delustering agent, a pigment, an ultraviolet absorbent, a fluorescent bleaching agent, a plasticizer, or any other additive. In order to restrain, particularly, oxidation-deterioration of the polypropylene resin, an antioxidant or thermal stabilizer is preferably incorporated thereinto. The respective species of the antioxidant and the thermal stabilizer are not particularly limited. The species are, for example, hindered phenolic type, phosphorus-containing type, and hindered amine type species. These species may be used singly or in combination. The addition amount thereof ranges preferably from 1 to 50000 ppm of the whole of the film. In the present invention, the film can ensure an excellent whiteness even when no fluorescent bleaching agent is added into the film.

In the cavity-containing polyester film of the present invention, inorganic particles may be optionally incorporated into the polyester resin or the polypropylene resin to improve the film in concealing performance or whiteness. For the inorganic particles, the following may be mentioned; silica, kaolinite, talc, calcium carbonate, zeolite, alumina, barium sulfate, titanium oxide, and zinc sulfide. Titanium oxide, calcium carbonate and barium sulfate are preferred from the viewpoint of the concealing performance and the whiteness. These inorganic particle species may be used singly or in any combination of two or more thereof. These particles may be incorporated into the film by adding the particles beforehand into the polyester resin or the polypropylene resin.

In the present invention, the method for blending the inorganic particles with the polyester resin or the polypropylene resin is not particularly limited, and is, for example, a method of dry-blending the polyester resin with the polypropylene resin, and then charging the blend, as it is, into a film-forming machine, or a method of dry-blending the polyester resin with the polypropylene resin, and then using an ordinary kneading machine that may be of various types to melt-knead the blend into a masterbatch.

The cavity-containing polyester film of the present invention has, as a layer structure thereof, a laminate structure including a layer (layer A) which includes a composition including a polyester resin and a polypropylene, and which has therein cavities, and layers (layers B) which each include a polyester resin containing inorganic particles and which are laminated, respectively, over both surfaces of the layer A. If the layer A including polypropylene resin is made naked as a surface layer of the film, naked partial particles of the polypropylene dispersed particles unfavorably cause process-contaminations such as roll-contamination. By covering the layer A containing a collected material with the layers B containing the inorganic pigment, the layers B have an advantageous effect of preventing the whiteness from being lowered.

From the viewpoint of the cavity-generation property, and a restraint of the polypropylene resin from being made naked, the proportion of the thickness of the layers B (total thickness of the two outermost layers) in the thickness of the whole of the film ranges preferably from 1 to 40%, more preferably from 5 to 30%. If the proportion of this layer-B-thickness is less than 1%, it is unfavorably feared that the polypropylene resin cannot be restrained from being made naked. In the meantime, if the proportion of the layer-B-thickness is more than 40%, cavities tend not to be easily formed for giving the film a sufficient lightness and cushion property.

In the present invention, for the inorganic particles incorporated into the layers B, the following may be mentioned; silica, kaolinite, talc, calcium carbonate, zeolite, alumina, barium sulfate, titanium oxide, and zinc sulfide. Titanium oxide, calcium carbonate and barium sulfate are preferred from the viewpoint of the concealing performance and the whiteness. Titanium oxide is particularly preferred. These inorganic particle species may be used singly or in any combination of two or more thereof. These particles may be incorporated into the film by adding the particles beforehand into the polyester resin.

The amount of the inorganic particles added into the layers B is not particularly limited, and is preferably from 1 to 35% by weight, more preferably 2 to 30% by weight of the whole of the layers B. If this addition amount is less than 1% by weight, the film tends not to be improved in concealing performance and whiteness. Conversely, if the addition amount is more than 35% by weight, it is unfavorably feared that the layer-B-material is deteriorated in film-formability and the film is remarkably deteriorated in mechanical strengths.

A coating layer may be laid onto at least one of both surfaces of the cavity-containing polyester film of the present invention to improve the film in wettability with, e.g., a printing ink or a coating agent, or in adhesiveness to the same. A compound constituting the coating layer is preferably a polyester resin, and may be a polyurethane resin, a polyester urethane resin, an acrylic resin, or any other known compound as a means for improving an ordinary polyester film in adhesiveness.

The method for laying the coating layer may be an ordinarily used method such as a gravure coating, kiss coating, dipping, spray coating, curtain coating, air knife coating, blade coating, or reverse roll coating method. For the stage of the coating, anyone of the following maybe adopted; a method of performing the coating before the drawing of the film, a method of performing the coating after the longitudinal drawing, a method of performing the coating on a surface of the film which has been drawn, and the like.

A description will be made about a method for producing the cavity-containing polyester film of the present invention. The method is preferably a method of melt-extruding a laminate into a sheet form, this laminate being a laminate including a layer (layer A) which includes a composition including a polyester resin and a polypropylene resin satisfying all of the above-mentioned requirements (1) to (3), and layers (layers B) which each include a polyester resin containing inorganic particles and which are laminated, respectively, over both surfaces of the layer A; and next drawing the sheet in at least one axial direction thereof to incorporate cavities into the layer A. Hereinafter, the producing method will be described in detail. However, the method for producing the cavity-containing polyester film is not particularly limited to this method. For example, a mixture including the above-mentioned composition is dried by a usual method and subsequently melt-extruded through a T-shaped mouthpiece into a sheet form, and then the sheet is caused to adhere closely onto a casting drum by, e.g., an electrostatic application method, and cooled and solidified to yield an undrawn film. Next, the undrawn film is drawn and oriented. Hereinafter, a description will be made about a sequentially biaxially drawing method, which is most generally used, in particular, about the following method as an example: a method of drawing the undrawn film longitudinally in the longitudinal direction and next drawing the film in the width direction. In a step of the longitudinal drawing in the longitudinal direction, the film is initially heated, and then drawn 2.5 to 5.0 times between many rolls having circumferential speeds different from each other. At this time, the heating means may be a method using a heating roll or a method using a noncontact type heating medium, or a combination of these methods. The film temperature is preferably set into a range from "Tg−10° C." to "Tg+50° C.". Next, the monoaxially drawn film is introduced into a tenter, and drawn 2.5 to 5 times in the width direction at a temperature of "Tg−10° C." to "Tm−10° C." or lower to yield a biaxially drawn film. The temperature Tg is the glass transition temperature of the polyester resin, and the temperature Tm is the melting point of the polyester resin. Preferably, the film yielded as described above is subjected to thermal treatment, as required. The treatment temperature ranges preferably from "Tm−60° C." to Tm.

The thus yielded cavity-containing polyester film is usable in the state that to the layer A is added a collected material composed of the ear portions generated in the step of forming the film, and film wastes generated by, e.g., a breaking trouble of the film. In other words, also when the collected material is further added to the layer (layer A), which includes the composition including the polypropylene satisfying the requirements (1) to (3) and the polyester resin, the use of a collected material of the cavity-containing polyester film of the present invention makes it possible to yield a cavity-containing polyester film which can keep cavity-generation property and gain a sufficient lightness and cushion property, and which is excellent in concealing performance and whiteness since the specified polypropylene resin is used as a raw material of the film of the invention.

The addition amount of the collected material is preferably from 5 to 60% by weight of the total of the individual compositions from the viewpoint of a decrease in raw material costs, the whiteness, and the film-formability. The collected material may be incorporated into the layers B. It is however preferred not to incorporate the collected material thereinto from the viewpoint of a deterioration in the whiteness, and the matter that the polypropylene resin in the collected material is made naked.

The cavity-containing polyester film of the present invention has an apparent density ranging preferably from 0.8 to 1.2 $g/cm^3$, more preferably from 0.90 to 1.15 $g/cm^3$. If the apparent density is less than 0.8 $g/cm^3$, the film is excessively large in cavity quantity to be bad in handleability when subjected to a post-processing such as print processing, or used. If the apparent density is more than 1.2 $g/cm^3$, the film does not gain a sufficient lightness or cushion property. The apparent density is a value obtained by a measuring method described in evaluating methods that will be later described.

The cavity-containing polyester film of the present invention has an optical density (OD value) that is preferably 0.55 or more, more preferably 0.6 or more. If the OD value is less than 0.55, the film tends not to gain a sufficient concealing performance, and when used in, e.g., a label, the film may unfavorably produce a poor image vividness in printing to damage a commercial value of the image. The OD value is a value that is obtained by a measuring method described in the evaluating methods, which will be later described, and that is a value in terms of the optical density when the thickness is regarded as 50 µm.

The cavity-containing polyester film of the present invention has a color tone b value that is preferably 4.0 or less, more preferably 3.0 or less. If the b value is more than 4.0, the film is poor in whiteness, and when made into, e.g., a label, the film may unfavorably produce a declined vividness in printing to damage a commercial value of the printed image. The lower limit of the b value is about −4.0.

The cavity-containing polyester film of the present invention has a bending resistance that is preferably 10 mN·cm or more, more preferably 15 mN·cm or more in each of the longitudinal direction (film flow direction) and the lateral direction (width direction) of the film. If the bending resistance is less than 10 mN·cm, the film unfavorably tends to become bad in handleability when subjected to post-processing or print processing. About the upper limit of the bending resistance, the bending resistance is preferably 500 mN·cm or less from the viewpoint of the handleability in the post-processing or the print processing. The bending resistance is a value obtained by a measuring method described in the evaluating method, which will be later described.

The cavity-containing polyester film of the present invention may be any thickness, and is preferably from 20 to 300 µm.

The cavity-containing polyester film yielded in this way is low in costs, and is excellent in lightness and cushion property to be used suitable for a substrate of, e.g., a label, a card or a packing material.

EXAMPLES

Hereinafter, the present invention will be specifically described by way of working examples thereof. The invention is not limited to the working examples. In the working examples, and comparative examples, individual evaluating items were measured by the following methods, respectively:
(1) Intrinsic Viscosity [η]
A sample was dissolved in a mixed solvent of phenol and tetrachloroethane (60/40 (ratio by weight)), and an Ostwald viscometer was used to measure the intrinsic viscosity thereof at 30° C. The measurement was made three times, and the average of the resultant values was calculated.

(2) Melt Flow Rate (MFR)

The MFR of a sample was measured according to JIS-K7210 under conditions of a temperature of 230° C. and a load of 2.16 kg. The unit thereof is "g/10-minutes".

(3) Deflection Temperature under Load

About the deflection temperature of a test specimen under load, a shaped body made of a polypropylene resin and having a size of 80 mm×10 mm×4 mm was formed as the test specimen in accordance with method B in a flatwise-mode in JIS-K7191, 2, and the temperature of the specimen was measured when the bending stress thereof was 0.45 MPa.

(4) Weight-Average Molecular Weight Mw and Molecular Weight Distribution (Mw/Mn)

The weight-average molecular weight Mw and the molecular weight distribution (Mw/Mn) of a sample were gained as values in terms of those of polystyrene, using gel permeation chromatography (GPC). Measuring conditions in the GPC are as follows:

Columns: TSKgel GMHHR-H(20)HT×3,
Solvent: 1,2,4-trichlorobenzene,
Measuring temperature: 140° C.,
Detector: RI detector for liquid chromatographs, and
Flow rate: 1.0 mL/min.

(5) Film-Formability

Over a film-forming period of 2 hours, one or more films as a sample were produced. In accordance with the number of times of the breaking of the film(s), the sample was evaluated as follows:

O: no breaking is caused,
△: the sample is broken two or three times, and
×: the sample is frequently broken, so that no film can be formed.

(6) Apparent Density

A film was cut out into four pieces of 5.0 cm square. The four pieces were put onto each other, and then a micrometer was used to measure the total thickness thereof in a four-digit significant figure. By changing the measured spot, ten spots thereof were measured. In this way, the average of the ten thicknesses of the four pieces put onto each other was calculated. This average is divided by four, and the resultant value was rounded into a three-digit significant figure. This value was defined as the average thickness (t: μm) per film. An automatic even balance was used to measure the weight of the same samples, the number of which was four, in a four-digit significant figure. In accordance with an expression described below, the apparent density of the film is gained. The apparent density was rounded into a three-digit significant figure.

Apparent density(g/cm$^3$)=$w/(5.0 \times 5.0 \times t \times 10^{-4} \times 4)$ (7) Optical Density (OD value)

The optical density of a sample was measured, using a transmission densitometer "Ihac-T5 model" manufactured by Ihara Electronic Industries Co., Ltd. The resultant value was changed to a value in terms of the optical density when the thickness of the sample was regarded as 50 μm. As the film has a higher optical density, the film was larger in concealing performance.

(8) Color Tone b Value

A color-difference meter (ZE 6000) manufactured by Nippon Denshoku Industries Co., Ltd. was used to measure the color tone b value of a sample according to JIS Z 8722. As the sample is smaller in b value, the sample is judged to be higher in whiteness to be weaker in yellowishness.

(9) Bending Resistance

The bending resistance of a sample was gained in accordance with JIS L1096, method B (sliding method) through the following steps: Each test specimen of the sample was produced into a size of 20 mm×150 mm. The body of a tester and a moving stand thereof were set to make their upper surfaces consistent with each other. The test specimen was put onto a stand of the tester, and a weight was set thereon. A handle of the tester was gently rotated to cause the specimen stand to fall down. When a free end of the specimen was separated apart from the specimen stand, the resultant scale δ was measured. The measurement was made about each of the front and rear sides of each of five of the specimens in each of the longitudinal and lateral directions. The respective average values in these directions were gained.

$Br=WL^4/8^\delta$ wherein:
Br: the bending resistance (mN·cm) of the test specimen,
W: the gravity per area (mN/cm$^2$) of the specimen,
L: the length (cm) of the specimen, and
δ: the read value (cm) of the scale.

Example 1

Production of Titanium Oxide Master Pellets (M1)

Into 50% by weight of a polyethylene terephthalate having an intrinsic viscosity of 0.62 was blended 50% by weight of an anatase type titanium dioxide having an average particle diameter of 0.3 lam (through an electron microscopic method), and the resultant blend was supplied into a vent type biaxial extruder to be kneaded. In this way, titanium-oxide-containing master pellets (M1) were produced.

Production of Undrawn Film

The following were mixed with each other, and the mixture was vacuum-dried to prepare a raw material of a cavity-containing polyester layer A: 85% by weight of a polyethylene terephthalate resin having an intrinsic viscosity of 0.62; 10% by weight of a polypropylene resin having an MFR of 2.5, an Mw of 320000, an Mw/Mn of 4.0, and a deflection temperature of 92° C. under load; and 5% by weight of the titanium-oxide-containing master pellets (M1). Separately, the following were pellet-mixed with each other, and the mixture was vacuum-dried to prepare a raw material of inorganic-particle-containing polyester layers B: 30% by weight of the titanium-oxide-containing master pellets (M1); and 70% by weight of the polyethylene terephthalate resin, which had the intrinsic viscosity of 0.62. These raw materials were supplied to different extruders, and melted at 285° C. to be laminated onto each other to produce a laminate in which the cavity-containing polyester layer A and the inorganic-particle-containing polyester layers B were located in the order of B/A/B. A feed block was used to join these layers to each other to give a ratio by thickness of 10/80/10. The laminate was extruded out through a T die onto a cooling drum having an adjusted temperature of 30° C. to produce an undrawn film having a two-species tri-layered structure.

Production of Cavity-Containing Polyester Film

The resultant undrawn film was evenly heated to 70° C., using heating rolls, and longitudinally drawn 3.4 times between two pairs of nip rolls having different circumferential speeds. At this time, as auxiliary heating devices for the film, infrared heating heaters (rated value: 20 W/cm) each having a gold reflecting film were set, at an intermediate portion of the nip rolls, to be opposed to both surface of the film (and to have distances of 1 cm, respectively, from the film surfaces) to heat the film. The thus yielded monoaxially drawn film was introduced into a tenter, and heated to 140° C. to be laterally drawn 4.0 times. The width thereof was fixed, and the drawn film was thermally treated at 235° C. and further relaxed at 210° C. by 3% in the width direction to yield a cavity-containing polyester film having a thickness of 50 lam. Table 1 shows results of the apparent density, the OD value, the color tone b value, and the film-formability of this example.

Example 2

Production of Cavity-Containing Polyester Film Using Collected Material

Ear portions yielded in the laterally drawing step in the tenter in Example 1 were used, and passed through a pulverizing step and a melt-extruding step to produce a collected material. In order to produce the same composition as the layer A had except that 25% by weight of the collected material was added to the layer A, an adjustment was made about the addition amounts of the polyethylene terephthalate resin, the polypropylene resin, and the titanium oxide master pellets (M1). The resultant was used as a raw material of the layer A. Except that this manner, the same method as (in Example 1) described above was performed to yield a collected-material-used cavity-containing polyester film having a thickness of 50 lam. Results thereabout are shown in Table 1.

Example 3

A collected-material-used cavity-containing polyester film was yielded in the same way as in Examples 1 and 2 except that the polypropylene resin in Example 1 was changed to one having an MFR of 7.0, an Mw of 240000, an Mw/Mn of 3.7, and a deflection temperature of 99° C. Results thereabout are shown in Table 1.

Example 4

A collected-material-used cavity-containing polyester film was yielded in the same way as in Examples 1 and 2 except that: the polypropylene resin in Example 1 was changed to one having an MFR of 1.9, an Mw of 330000, an Mw/Mn of 5.0, and a deflection temperature of 110° C.; and the collected material was added in a proportion of 45% by weight. Results thereabout are shown in Table 1.

Example 5

A collected-material-used cavity-containing polyester film was yielded in the same way as in Examples 1 and 2 except that: instead of the titanium oxide master pellets (M1) for the layers B in Example 1, master pellets were produced into which 30% by weight of calcium carbonate having an average particle diameter of 1.3 μm (through an electron microscopic method) was blended; and as the raw material of the layers B, a product was used which was yielded by pellet-mixing 45% by weight of the master pellets with 55% by weight of a polyethylene terephthalate resin having an intrinsic viscosity of 0.62. Results thereabout are shown in Table 1.

Comparative Example 1

A collected-material-used cavity-containing polyester film was yielded in the same way as in Examples 1 and 2 except that the polypropylene resin in Example 1 was changed to one having an MFR of 30.0, an Mw of 157000, an Mw/Mn of 2.8, and a deflection temperature of 100° C. Results thereabout are shown in Table 1.

Comparative Example 2

A collected-material-used cavity-containing polyester film was yielded in the same way as in Examples 1 and 2 except that: the polypropylene resin in Example 1 was changed to one having an MFR of 3.0, an Mw of 350000, an Mw/Mn of 8.9, and a deflection temperature of 110° C.; and the two-species tri-layered structure was changed to a mono-layered structure. In order to make the composition ratio at this time equal to that in the entire layers in Example 1, an adjustment was made about the addition amounts of the polyethylene terephthalate resin, the polypropylene resin, and the titanium oxide master pellets (M1). When the film was laterally drawn, the film was sporadically broken. Thus, before the film was broken, a sample thereof was collected in a small amount. Individual physical properties of the sample were measured. The results are shown in Table 1.

Comparative Example 3

A collected-material-used cavity-containing polyester film was yielded in the same way as in Examples 1 and 2 except that the polypropylene resin in Example 1 was changed to one having an MFR of 3.0, an Mw of 350000, an Mw/Mn of 4.2, and a deflection temperature of 80° C. Results thereabout are shown in Table 1.

Comparative Example 4

A formation of a cavity-containing polyester film was performed in the same way as in Example 1 except that the polypropylene resin was changed to one having an MFR of 0.5, an Mw of 470000, an Mw/Mn of 4.5, and a deflection temperature of 112° C. However, when the film was laterally drawn, the film was frequently broken. Thus, no sample was able to be collected.

Comparative Example 5

A collected-material-used cavity-containing polyester film was yielded in the same way as in Examples 1 and 2 except that 1% by weight of a PEG (polyethylene glycol) (molecular weight: 4000) as a dispersing agent was added into the layer A. When the film was laterally drawn, the film was sporadically broken. Thus, before the film was broken, a sample thereof was collected in a small amount. Individual physical properties of the sample were measured. The results are shown in Table 1.

TABLE 1

| | Unit | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|---|
| Raw material polypropylene resin | MFR | g/10 min. | 2.5 | 2.5 | 7.0 | 1.9 | 2.5 | 30.0 | 3.0 | 3.0 | 0.5 | 2.5 |
| | Mw | $10^3$ | 320 | 320 | 240 | 330 | 320 | 157 | 350 | 350 | 470 | 320 |
| | Mw/Mn | | 4.0 | 4.0 | 3.7 | 5.0 | 4.0 | 2.8 | 8.9 | 4.2 | 4.5 | 4.0 |
| | Deflection temperature under load | °C. | 92 | 92 | 99 | 110 | 92 | 100 | 110 | 80 | 112 | 92 |
| Cavity-containing polyester film | Apparent density | g/cm$^3$ | 1.09 | 1.10 | 1.13 | 1.02 | 1.05 | 1.25 | 1.18 | 1.23 | — | 1.25 |
| | OD value | | 0.64 | 0.64 | 0.61 | 0.68 | 0.60 | 0.51 | 0.58 | 0.52 | — | 0.51 |
| | Color tone b value | | 1.3 | 1.6 | 1.7 | 1.9 | 2.3 | 2.5 | 4.3 | 1.7 | — | 4.5 |
| | Bending resistance (in longitudinal direction) | mN·cm | 19 | 19 | 20 | 15 | 16 | 21 | 20 | 21 | — | 21 |
| | Bending resistance (in lateral direction) | | 20 | 20 | 21 | 15 | 16 | 21 | 21 | 21 | — | 21 |
| | Film-formability | | ◯ | ◯ | ◯ | ◯ | ◯ | ◯ | Δ | ◯ | X | Δ |

INDUSTRIAL APPLICABILITY

The present invention makes it possible to provide a cavity-containing polyester film which is low in production costs, which is excellent in lightness and cushion property without damaging properties of the film even when a collected material is used for the film, and which is good in concealing performance and whiteness.

The invention claimed is:

1. A cavity-containing polyester film, comprising:
   a layer A which has therein cavities, and
   layers B which each comprise a polyester resin containing inorganic particles and which are laminated, respectively, over both surfaces of the layer A;
   the layer A comprises a composition comprising a polyester resin and an incompatible resin which is thermoplastic resin incompatible with the polyester resin;
   a proportion of a polypropylene resin in a total amount of the incompatible resin in the layer A being 90% or more by weight;
   a content of the polypropylene resin is 3-25% by weight of a total amount of the composition in layer A;
   the polypropylene resin satisfying all of the following requirements (1) to (3):
   (1) the polypropylene resin having a melt flow rate (MFR) ranging from 1.0 to 10 g/10-minutes (at a temperature of 230° C. under a load of 2.16 kg),
   (2) the polypropylene resin showing a deflection temperature of 85° C. or higher under load (at a bending stress of 0.45 MPa), and
   (3) the polypropylene resin having a weight-average molecular weight Mw ranging from 200000 to 330000, this weight-average molecular weight being measured by gel permeation chromatography (GPC), and having a molecular weight distribution ranging from 2 to 5, this molecular weight distribution being represented as the ratio of the weight-average molecular weight Mw to the number-average molecular weight Mn of the polypropylene resin (Mw/Mn),
   the cavity-containing polyester film has an apparent density ranging from 0.8 to 1.2 g/cm$^3$ and having a bending resistance of 10 mN·cm or more in each of the longitudinal direction and the lateral direction of the film,
   the cavity-containing polyester film has an optical density (OD value) of 0.55 or more (in terms of a value when the film thickness is regarded as 50 μm), and
   the layer A further comprises a waste material of the cavity-containing polyester film in a proportion of 5 to 60% by weight.

2. The cavity-containing polyester film according to claim 1, wherein the inorganic particles in the layers B comprise titanium oxide.

3. The cavity-containing polyester film according to claim 1, wherein the cavity-containing polyester film has a color tone b-value of 4 or less.

4. The cavity-containing polyester film according to claim 1, wherein the polypropylene resin has a melt flow rate (MFR) ranging from 1.5 to 7.0 g/10-minutes (at a temperature of 230° C. under a load of 2.16 kg).

5. The cavity-containing polyester film according to claim 1, wherein the polypropylene resin has a melt folow rate (MFR) ranging from 1.5 to 4.0 g/10-minutes (at a temperature of 230° C. under a load of 2.16 kg).

6. The cavity-containing polyester film according to claim 1, wherein the proplyene resin shows a deflection temperature of 90° C. or higher under load (at a bending stress of 0.45 MPa).

7. The cavity-containing polyester film according to claim 1, wherein the proplyene resin shows a deflection temperature of 95° C. or higher under load (at a bending stress of 0.45 MPa).

8. The cavity-containing polyester film according to claim 1, wherein the proplyene resin has a weight-average molecular weight Mw ranging from 240000 to 330000, this weight-average molecular weight being measured by gel permeation chromatography (GPC).

9. The cavity-containing polyester film according to claim 1, wherein the inorganic particles in the layers B comprise calcium carbonate.

10. The cavity-containing polyester film according to claim 1, wherein the inorganic particles in the layers B comprise barium sulfate.

11. The cavity-containing polyester film according to claim 1, wherein the cavity-containing polyester film has an apparent density of from 0.90 to 1.15 g/cm$^3$.

12. The cavity-containing polyester film according to claim 3, wherein the cavity-containing polyester film has a color tone b-value of 3 or less.

13. The cavity-containing polyester film according to claim 1, wherein the cavity-containing polyester film has a bending resistance of 15 mN·cm or more in each of the longitudinal direction and the lateral direction of the film.

14. The cavity-containing polyester film according to claim 1, wherein a coating layer is laid onto at least one of the surfaces of the cavity-containing polyester film, and
a compound constituting the coating layer is at least one selected from the group consisting of a polyester resin, a polyurethane resin, a polyester urethane resin, and an acrylic resin.

15. The cavity-containing polyester film according to claim 1, wherein the cavity containing polyester film is composed to function as a synthetic paper.

16. The cavity-containing polyester film according to claim 1, wherein the polypropylene resin is a crystalline propylene having propylene units in a proportion that is preferably 95% or more by mole.

17. A method for producing the cavity-containing polyester film according to claim 1, the method comprising:
producing a cavity-containing polyester film having an apparent density ranging from 0.8 to 1.2 g/cm$^3$, comprising the step of: melt-extruding a laminate into a sheet form, this laminate being a laminate comprising a layer (layer A) which comprises a composition comprising a polyester resin and a polypropylene resin satisfying all of the following requirements (4) to (6), and layers (layers B) which each comprise a polyester resin containing inorganic particles and which are laminated, respectively, over both surfaces of the layer A:
(4) the polypropylene resin having a melt flow rate (MFR) ranging from 1.0 to 10 g/10-minutes (at a temperature of 230° C. under a load of 2.16 kg),
(5) the polypropylene resin showing a deflection temperature of 85° C. or higher under load (at a bending stress of 0.45 MPa), and
(6) the polypropylene resin having a weight-average molecular weight Mw ranging from 200000 to 450000, this weight-average molecular weight being measured by gel permeation chromatography (GPC), and having a molecular weight distribution ranging from 2 to 6, this molecular weight distribution being represented as the ratio of the weight-average molecular weight Mw to the number-average molecular weight Mn of the polypropylene resin (Mw/Mn);
and next drawing the sheet into at least one axial direction of the sheet to incorporate cavities into the layer A.

18. The method according to claim 13, wherein a waste material yielded from the cavity-containing polyester film is further incorporated into the layer A in a proportion of 5 to 60% by weight.

* * * * *